United States Patent
Kuhn et al.

(10) Patent No.: US 12,523,211 B2
(45) Date of Patent: Jan. 13, 2026

(54) OPTIMIZED VALVE SYSTEM FOR PISTON COMPRESSORS—VALVE LAMINA AND VALVE RETAINER HAVING AERODYNAMIC DAMPING

(71) Applicant: KNORR-BREMSE SYSTEME FÜR SCHIENENFAHRZEUGE GMBH, Munich (DE)

(72) Inventors: Alexander Kuhn, Aichstetten (DE); Martin Schmid, Munich (DE)

(73) Assignee: KNORR-BREMSE Systeme für Schienenfahrzeuge GmbH (DE)

( * ) Notice: Subject to any disclaimer, the term of this patent is extended or adjusted under 35 U.S.C. 154(b) by 270 days.

(21) Appl. No.: 18/266,084

(22) PCT Filed: Nov. 12, 2021

(86) PCT No.: PCT/EP2021/081577
§ 371 (c)(1),
(2) Date: Jun. 8, 2023

(87) PCT Pub. No.: WO2022/122305
PCT Pub. Date: Jun. 16, 2022

(65) Prior Publication Data
US 2024/0093681 A1 Mar. 21, 2024

(30) Foreign Application Priority Data
Dec. 9, 2020 (DE) .................... 10 2020 132 824.9

(51) Int. Cl.
*F04B 39/10* (2006.01)
*F16K 15/16* (2006.01)

(52) U.S. Cl.
CPC .......... *F04B 39/1073* (2013.01); *F16K 15/16* (2013.01)

(58) Field of Classification Search
CPC ............................. F16K 15/16; F04B 39/1073
See application file for complete search history.

(56) References Cited

U.S. PATENT DOCUMENTS

| | | |
|---|---|---|
| 2,040,542 A | 5/1936 | Baker |
| 2,065,062 A | 12/1936 | Dugelay |
| 2,302,447 A | 11/1942 | King et al. |
| 2,417,246 A | 3/1947 | Ferguson |

(Continued)

FOREIGN PATENT DOCUMENTS

| | | |
|---|---|---|
| AT | 393009 B | 7/1991 |
| DE | 2844854 A1 | 4/1980 |
| RU | 2084700 C1 | 7/1997 |

(Continued)

OTHER PUBLICATIONS

International Search Report corresponding to PCT/EP2021/081577 dated Jan. 5, 2022.

*Primary Examiner* — Eric Keasel
(74) *Attorney, Agent, or Firm* — Barnes & Thornburg LLP (57) ABSTRACT

A valve assembly for a piston compressor, in particular an oil-free piston compressor for generating compressed air in a rail vehicle, includes a valve plate having a compressed-air opening, a valve retainer and a valve lamina which is flexible and/or movable in relation to the valve retainer and is provided for opening and closing the compressed-air opening; wherein a damping and/or braking device is provided which is associated with the valve lamina.

13 Claims, 3 Drawing Sheets

(56) References Cited

U.S. PATENT DOCUMENTS 3,939,867 A * 2/1976 Lundvik ............. F16K 15/1402
137/856
10,072,653 B2 * 9/2018 Mellar ................ F04B 39/1073

FOREIGN PATENT DOCUMENTS

RU        2142576 C1   12/1999
RU          39920 U1    8/2004
WO   2002044564 A1    6/2002

* cited by examiner

OPTIMIZED VALVE SYSTEM FOR PISTON COMPRESSORS—VALVE LAMINA AND VALVE RETAINER HAVING AERODYNAMIC DAMPING

PRIORITY

This patent application is a U.S. National Phase of International Patent Application No. PCT/EP2021/081577 filed Nov. 12, 2021, which claims priority to German Patent Application No. 10 2020 132 824.9, the disclosure of which being incorporated herein by reference in their entireties.

FIELD

The disclosed embodiments relate to a valve assembly for a piston compressor, in particular an oil-free piston compressor, for generating compressed air in a rail vehicle, for example for actuation of the brake mechanism.

BACKGROUND

In the railroad or rail vehicle sector, piston compressors are often used for generating compressed air, e.g., for actuation of the brake mechanism. There are various designs in principle. Piston compressors, in particular oil-free compressors, have proven fundamentally suitable, but still leave room for improvement.

SUMMARY

Disclosed embodiments are concerned with improving such piston compressors. An important topic that has not yet been the focus of development in the rail vehicle sector is the acoustic behavior of piston compressors. Particularly, the alternating movement of the functional components has a negative effect on the acoustic emission behavior.

Disclosed embodiments improve the acoustics and/or the mass flow profile in the case of piston compressors.

BRIEF DESCRIPTION OF THE FIGURES

Properties, features and advantages will become clear below by the description of disclosed embodiments with reference to the accompanying illustrative drawings, in which.

DETAILED DESCRIPTION

Piston compressors of the type in question use valve assemblies for generating compressed air, wherein the piston compressor has a valve plate with a plurality of compressed-air openings for the compressed air to be provided. The valve assemblies comprise a valve retainer and a valve lamina, which can be moved relative to the valve retainer, for opening and closing the compressed-air opening. The movement of the valve lamina is excited by the pressure difference between the compression chamber and the air chambers in the cylinder head of the piston compressor. In this case, very large pressure differences and thus very high acceleration forces occur on the valve lamina precisely at the beginning of the opening cycle. Owing to the high acceleration forces, the valve lamina strikes the lamina retainer unbraked at high speed.

Disclosed embodiments are based on the recognition that the behavior of the valve assembly has a considerable influence on the overall acoustic emissions. These emissions arise both from the excitation of the air volumes by the valve movement and from the impact of the valves against the valve plate or the corresponding valve retainer. In addition to the acoustic excitation, the valve movement can also influence the mass flow profile and thus volumetric efficiency. This, in turn, has a direct effect on the efficiency of the compressor.

Currently, the valve retainers are generally produced as a simple sheet metal component. Both the valve retainer and the valve lamina have a flat plate-type or disk-type structure. In the opened valve state, the valve lamina rests with its upper side flat on the lower side of the valve retainer.

Owing to the piston movement in the cylinder and the associated compression and expansion of the air in the cylinder, the resulting pressure differences between the cylinder and the air volumes (on the suction and pressure sides) cause the respective valve assemblies to be mechanically excited to open. The movement of the valve lamina is influenced by its internal forces, its inertia and the externally acting forces, in particular those caused by the air. At the start of opening, the forces caused by the air act on the upper and lower side of the valve lamina. As it moves in the direction of the valve retainer, the valve lamina rolls on the latter. During this process, the contact area between the valve lamina and the valve retainer and thus also the forces acting on the surface of the valve lamina facing the valve retainer change.

Disclosed embodiments overcome the disadvantages of the prior art, in particular to improve the acoustics and/or the mass flow profile in the case of piston compressors.

According to the above, a valve assembly is provided for a piston compressor, in particular an oil-free piston compressor, for generating compressed air in a rail vehicle. Piston compressors are used in the railroad or rail vehicle sector, e.g., for actuation of the braking mechanism. In general, piston compressors can be divided into oil-lubricated and oil-free piston compressors. Piston compressors of the type in question comprise a valve plate with a compressed-air opening for the compressed air to be provided. The compressed air to be provided can, for example, be generated and/or stored in a compression chamber and/or can be discharged via the compressed-air opening into an air chamber, for example in a cylinder head of the piston compressor.

According to disclosed embodiments, the valve assembly comprises a valve retainer and a valve lamina, which is flexible and/or can be moved relative to the valve retainer, for opening and closing the compressed-air opening. For example, the valve lamina can be mounted flexibly, thus making possible a relative movement with respect to the valve retainer for adjustment of the compressed air flow. In this case, the valve lamina can consist of or comprise a flexible, elastic material and can be deformed, in particular elastically, to expose and/or close the compressed-air opening. In the reverse movement, that is to say for closing and/or opening the compressed-air opening, an elastic deformation restoring force can be built up as a result of the elastic deformation in the one direction of movement of the valve lamina, moving the valve lamina back into the other direction of actuation. For example, the valve lamina can be configured in such a way that the elastic deformation restoring force acts in the closing direction, with the result that, if no counterforce or actuating force is being applied to the valve lamina, the valve lamina is in the closed state, i.e. closes the compressed-air opening. To open the compressed-air opening, use is made of the pressure difference between the compression chamber and the air chamber of the piston compressor. The actuating force for opening the valve lamina, in particular the prevailing pressure difference upstream and downstream of the valve lamina, exceeds the elastic deformation restoring force of the valve lamina when the compressed-air opening is exposed.

According to disclosed embodiments, the valve assembly is characterized by a damping and/or braking device associated with the valve lamina. The damping and/or braking device can be capable of damping and/or braking a movement of the valve lamina during the opening and closing of the compressed-air opening. For example, the damping and/or braking device can reduce a speed and/or an acceleration of the valve lamina during the opening or closing of the compressed-air opening. It is furthermore possible for the damping and/or braking device to be configured to damp the impact of the valve lamina on the valve retainer during the opening of the compressed-air opening and/or the impact of the valve lamina on the valve plate during the closing of the compressed-air opening.

In other words, the damping between the valve lamina and the valve retainer and/or the valve lamina and the valve plate has the effect that the impact of the valve lamina on the corresponding other component is softer, quieter and/or slower, thus reducing vibration excitation of the respective other component, thereby resulting in reduced acoustic emissions as the valve lamina adopts the respective position.

In one illustrative embodiment, the damping and/or braking device has an aerodynamic damping device. For example, the damping and/or braking device is implemented as an aerodynamic damping device. An aerodynamic damping device can be understood, in general, to mean that air, in particular compressed air, is used to damp and/or brake the movement of the valve lamina. The aerodynamic damping device has proven to be particularly advantageous inasmuch as the air, in particular compressed air, which is present in any case can be used to damp and/or brake the valve lamina, in particular without the need for additional, separate damping and/or braking mechanisms.

According to one illustrative development of the valve assembly of the disclosed embodiments, the damping and/or braking device is configured to form an air reservoir between the valve retainer and the valve lamina during the opening of the compressed-air opening by the valve lamina, i.e. when the valve lamina is removed from the valve plate, in which reservoir air for damping and/or braking the valve lamina is at least temporarily enclosed. The air reservoir can be configured in such a way that contact between the valve lamina and the valve retainer is not necessarily ruled out. For example, the air reservoir can be configured in such a way that it empties, in particular continuously, as the time increases, with the result that the valve lamina may well come into stop contact, this process then taking place in a damped and/or braked manner. The air reservoir is advantageously configured in such a way that it is or continues to be maintained at least until the movement of the valve lamina has been very largely damped or braked, in particular by at least 50%, at least 60%, at least 70%, or at least 80%, of a maximum speed and/or maximum acceleration of the valve lamina during the opening and/or closing of the compressed-air opening.

According to a further illustrative embodiment of the valve assembly of the disclosed embodiments, the valve lamina and the valve retainer are matched to one another in terms of shape in such a way that the valve lamina and the valve retainer can move at least partially into one another during the opening or the compressed-air opening by the valve lamina. In other words, the valve retainer at least partially accommodates the valve lamina, or vice versa, during the opening of the compressed-air opening by the valve lamina. On the one hand, this ensures a particularly space-saving damping and/or braking device. Furthermore, a possibility for obtaining an aerodynamic damping device in a manner which is simple in terms of design is achieved, wherein the air reservoir is formed between the valve retainer and the valve lamina as the valve lamina and the valve retainer move into one another, with the result that the air brakes and/or damps the movement of the valve lamina relative to the valve retainer. For example, the valve lamina and the valve retainer can move into each other in a substantially telescopic manner.

In a further illustrative disclosed embodiment, the valve retainer or the valve lamina has a skirt which is dimensioned and/or arranged on the valve retainer or the valve lamina with respect to the respective other component, either the valve retainer or the valve lamina, in such a way that, during the opening of the compressed-air opening by the valve lamina, the skirt surrounds an outer contour of the respective other component, either the valve lamina or the valve retainer, at least in some section or sections. For example, the skirt can surround at least 20%, in particular at least 30%, at least 40%, or at least 50%, of the outer contour of the component to be surrounded. During the opening of the compressed-air opening by the valve lamina, the valve lamina moves continuously in the direction of the valve plate. The skirt, also referred to as the damping and/or braking skirt, projects in the direction of the respective other component, either the valve lamina or the valve retainer, on which the skirt is not arranged, with the result that the skirt overlaps an end-side outer circumferential wall of the valve retainer or valve lamina, in particular continuously, as the opening movement of the valve lamina increases. As soon as an overlap between the skirt and the valve lamina or valve retainer is achieved, an air reservoir is formed between the valve retainer and the valve lamina, thus enabling the movement of the valve lamina to be braked or damped. As a result of the overlapping of the skirt and the valve retainer or valve lamina and the projection of the skirt from the respective component to which the skirt is attached, the air reservoir can be formed in the free space between the valve retainer and the valve lamina by the enclosure of air, which damps or brakes the movement of the valve lamina.

According to one illustrative development of the valve assembly, the skirt is produced in one piece with the valve retainer or the valve lamina. For example, the skirt is produced by forming or primary forming.

In a further illustrative embodiment, the skirt is arranged on an edge of the valve retainer or of the valve lamina and extends along at least 20%, in particular at least 30%, at least 40% or at least 50%, of the contour of the valve retainer or valve lamina. For example, the skirt extends around at most 90%, in particular at most 80%, 70% or at most 60%, of the contour of the valve retainer or of the valve lamina, depending on the component on which the skirt is arranged.

According to one illustrative development of the valve assembly, the valve lamina and the valve retainer have an elongate shape and are secured, in particular screwed, to one another in the region of a short end. For example, the valve lamina and the valve retainer can be screwed to the valve plate. The skirt is arranged or integrally formed in the region of the opposite short end. During the opening of the compressed-air opening by the valve lamina, the mutually secured short ends of the valve lamina and valve retainer remain stationary, while the opposite skirt short end executes an opening movement. This means that a movement amplitude of the valve lamina increases continuously from the securing short end toward the skirt short end. For example, a skirt dimension, in particular skirt height, is matched to the movement amplitude of the valve lamina.

In a further illustrative embodiment, the valve lamina and the valve retainers are of planar design. In this case, the skirt extends in the direction of the respective other component, either the valve lamina or the valve retainer, substantially perpendicularly to the planar extent of the valve lamina or of the valve retainer. Owing to the fact that the skirt projects from the planar extent, in particular from the upper side or lower side facing the respective other component, either the valve lamina or the valve retainer, the skirt comes into engagement or into the region of the respective other component of the valve lamina and valve retainer, before the planar surface, thus enabling the aerodynamic damping device to be formed, in particular an air reservoir to be formed between the valve retainer and the valve lamina.

According to one illustrative development of the valve assembly, a height dimension of the skirt increases, in particular continuously, in the direction starting from the securing short end toward the skirt short end. It was recognized that the main movement of the valve lamina is carried out in the region of the skirt short end and, to this extent, it is there that the greatest height dimension of the skirt is required. In the direction of the fastening short end, the skirt height can decrease, thus making it possible to save material and thus reduce costs.

In a further illustrative embodiment, the valve retainer and the valve lamina are matched to one another in terms of shape in such a way that, during the opening of the compressed-air opening by the valve lamina, a gap is provided or remains between the skirt and the outer contour of the respective other component, either the valve retainer or the valve lamina, which is surrounded by the skirt. Via the gap, air can flow out of an air reservoir which is formed between the valve retainer and the valve lamina and which, in particular, forms the dynamic damping device. For example, with the aid of the skirt, the compressed air flowing out or in from the cylinder volume or from the inlet volume can be used to prevent the air between the valve retainer and the valve lamina from escaping by this counterpressure. The dwell time of the stored compressed air is thus prolonged and thus the damping property and/or braking property of the skirt is increased.

According to one illustrative development of the valve assembly, the damping and/or braking effect of the valve lamina can be adjusted by the cross section of the gap between the skirt and the outer contour of the respective other component, either the valve lamina or the valve retainer, which is surrounded by the skirt. For example, the gap cross section and the resulting outflowing air velocity in relation to the valve lamina velocity determine the damping property of the valve lamina.

In a further illustrative embodiment, the valve assembly has a valve plate having a compressed-air opening. In this case, the valve lamina is associated with the valve plate in such a way that, in a closed state, the valve lamina closes the compressed-air opening, and the damping device and/or braking device is configured to damp and/or brake a movement of the valve lamina for closing the compressed-air opening. According to disclosed embodiments, it was recognized that the damping and/or braking device associated with the valve lamina can also be used to reduce the acoustic emissions during the closing of the valve assembly, i.e. when the valve lamina strikes the valve plate, which has a valve seat. To this extent, the overall acoustic emissions of the valve assembly according to the disclosed embodiments are significantly reduced in comparison with the prior art.

According to one illustrative development of the disclosed embodiments, during the closing of the compressed-air opening by the valve lamina, a vacuum is built up between the valve retainer and the valve lamina, which vacuum reduces a closing speed and/or closing acceleration of the valve lamina in the direction of the valve plate. For example, owing to the restricted inflow behavior of the air into the free space, in particular the air reservoir, formed between the valve retainer and the valve lamina, which is due to the small gap between the valve lamina and the valve retainer, a vacuum is produced downstream of the valve lamina, namely between the valve lamina and the valve retainer. This vacuum has a negative effect on the closing acceleration and closing speed of the valve lamina. Owing to the reduced acceleration of the valve lamina, this results in a reduced impact speed of the valve lamina on the valve plate. To this extent, the contact impulse or impact during the closing of the lamina with the valve plate and the associated acoustic excitation can be reduced. It is furthermore possible to exert a positive effect on the closing time and thus on the mass flow. By the geometrical configuration of the damping and/or braking skirt and the geometrical implementation of the gap between the valve lamina and the valve retainer, in particular the gap between the skirt and the respective other component, either the valve retainer or the valve lamina, on which the skirt is not arranged, it is thus possible to set the mass flow, i.e. the compressed air flow flowing through the valve assembly.

According to a further aspect of the disclosed embodiments, which can be combined with the preceding aspects and illustrative embodiments, a valve retainer is provided for a valve assembly of a piston compressor, in particular an oil-free piston compressor, for generating compressed air in a rail vehicle. The valve assembly can be embodied in accordance with one of the above-described aspects or illustrative embodiments, for example. Piston compressors are used in the railroad or rail vehicle sector, e.g., for actuation of the braking mechanism. In general, piston compressors can be divided into oil-lubricated and oil-free piston compressors. Piston compressors of the type in question comprise a valve plate with a compressed-air opening for the compressed air to be provided. The compressed air to be provided can, for example, be generated and/or stored in a compression chamber and/or can be discharged via the compressed-air opening into an air chamber, for example in a cylinder head of the piston compressor.

The valve retainer according to the disclosed embodiments includes a planar extent with a side, in particular a lower side, to be turned toward a valve lamina for adjustment of a compressed air flow, on which side a skirt is provided, which is, in particular, oriented perpendicularly to the planar extent and is configured to surround an outer contour of the valve lamina at least in some section or sections. The side can be, for example, the lower side of the valve retainer. In particular, the skirt is configured to surround the outer contour of the valve lamina at least in some section or sections in a closed state of the valve assembly.

It should be clear that the statements made with reference to the valve assembly with respect to the presently disclosed embodiments apply analogously to the valve retainer according to the disclosed embodiments.

According to a further aspect of the presently disclosed embodiments, which can be combined with the preceding aspects and illustrative embodiments, a valve lamina is provided for a valve assembly of a piston compressor, in particular an oil-free piston compressor, in particular a valve assembly designed in accordance with one of the above-described aspects or illustrative embodiments, for generating compressed air in a rail vehicle. Piston compressors are used in the railroad or rail vehicle sector, e.g., for actuation of the braking mechanism. In general, piston compressors can be divided into oil-lubricated and oil-free piston compressors. Piston compressors of the type in question comprise a valve plate with a compressed-air opening for the compressed air to be provided. The compressed air to be provided can, for example, be generated and/or stored in a compression chamber and/or can be discharged via the compressed-air opening into an air chamber, for example in a cylinder head of the piston compressor.

The valve lamina according to the disclosed embodiments includes a planar extent with a side, in particular an upper side, to be turned toward a valve retainer for adjustment of a compressed air flow, on which side a skirt is provided, which is, in particular, oriented perpendicularly to the planar extent and is configured to surround an outer contour of the valve retainer at least in some section or sections, in particular in a closed state of the valve assembly.

It should be clear that the statements made in relation to the valve assembly according to the disclosed embodiments are intended to apply analogously to the valve lamina according to the disclosed embodiments.

According to a further aspect of the presently disclosed embodiments, which can be combined with the preceding aspects and illustrative embodiments, a piston compressor, in particular an oil-free piston compressor, for generating compressed air in a rail vehicle is provided. The piston compressor according to the disclosed embodiments may comprises a valve assembly designed in accordance with one of the above aspects or illustrative embodiments, a valve lamina according to the disclosed embodiments and/or a valve retainer according to the disclosed embodiments.

In the following description of illustrative embodiments, a valve assembly for a piston compressor, in particular an oil-free piston compressor 32, for generating compressed air, for example in a rail vehicle 33, is provided in general with the reference numeral 1. The valve assembly 1 comprises a valve plate 3, which can be of flat and thin-walled design, where thin-walled is understood to mean that the extent of the valve plate 3 in its plane is significantly greater than its wall thickness. The valve plate 3 comprises a plurality of through bores 5 to enable the valve plate 3 to be used for piston compressors of different dimensions and/or designs. The through bores 5 are used as compressed-air openings for the compressed air to be provided or for securing further components of the valve assembly 1. Furthermore, the valve plate 3 has four evenly distributed securing bores 31, which are arranged in the edge region of the valve plate 3 and which serve, for example, for screwing and/or centering the valve plate 3 on or against a cylinder or a cylinder head (not illustrated).

Figure 1:
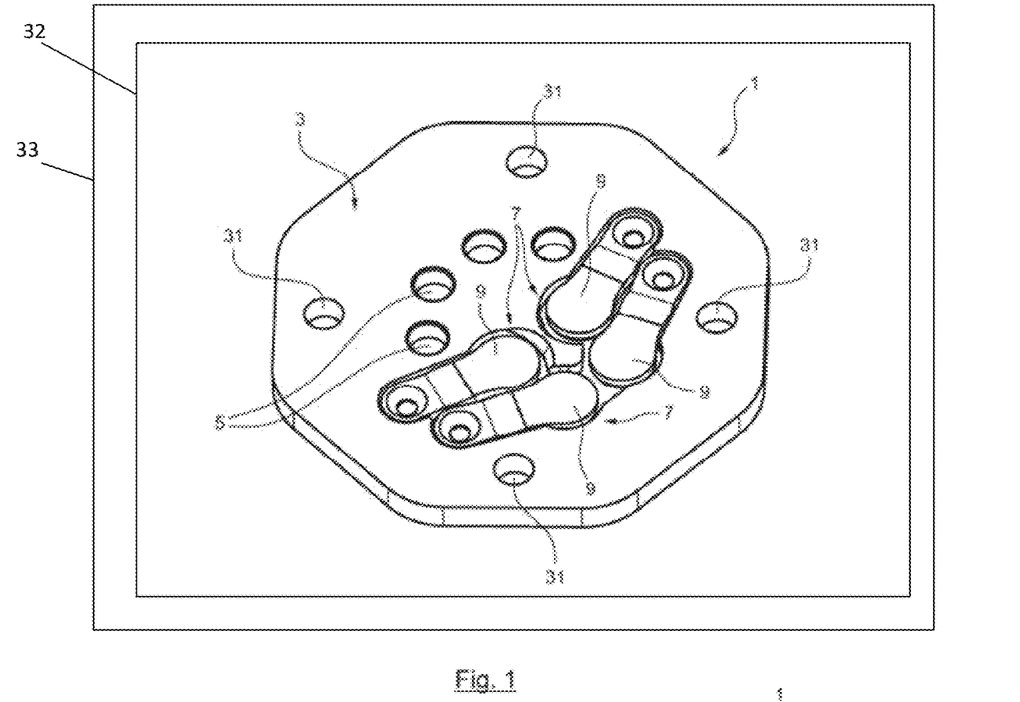
FIG. 1 shows a perspective view of an illustrative embodiment of a valve assembly according to disclosed embodiments.

According to the illustrative embodiment in FIG. 1, the valve assembly 1 comprises four valves 7, by which in each case a compressed-air opening 5 associated with the respective valve 7 can be opened or closed to ensure or prevent a compressed air flow through the compressed-air opening 5.

The details of the valve assembly 1 are discussed below. FIG. 1 shows a valve retainer 9 of the respective valve 7 from above. It can also be seen from FIG. 1 that the valve plate 3 can have, for example, a substantially octagonal basic structure, wherein respective corners may be rounded. It should be clear that the valve plate can have any other desired cross-sectional shapes, wherein the cross section depends essentially on the available space within the piston compressor.

Figure 2:
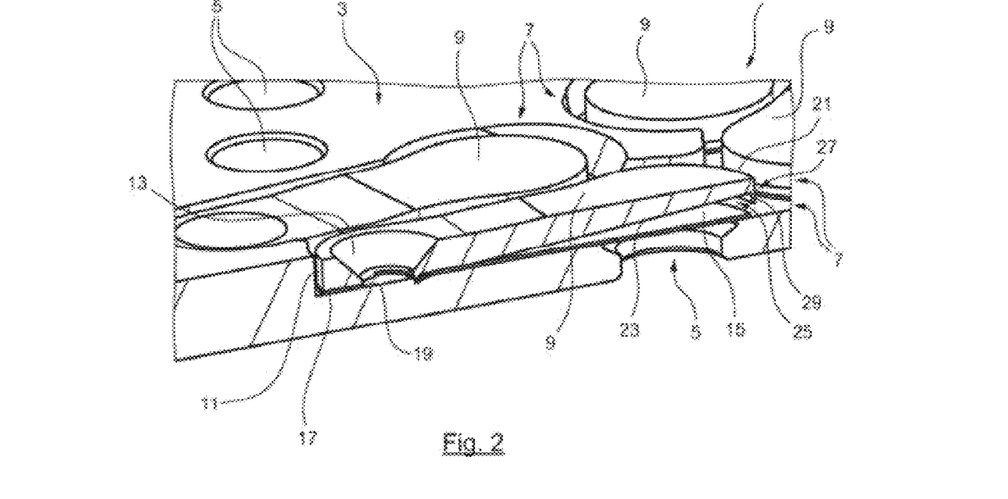
FIG. 2 shows a detail sectional view in perspective illustration of the valve assembly shown in FIG. 1.

FIG. 2 should be understood as a sectional view through one of the valves 7, in particular through a valve retainer 9. The valve retainer 9 has a substantially elongate, flat shape and can have a lug or spoon shape. The valve retainer 9 can be secured to the valve plate 3 in the region of a short end 11. For this purpose, the valve retainer 9 has a countersunk bore 13 in the region of the short end 11 in order, for example, to enable a screw connection to the valve plate 3. This means that the valve retainer 9 is connected in a substantially fixed manner to the valve plate 3 and, during operation of the piston compressor, a relative movement of the valve retainer 9 with respect to the valve plate 3 is substantially prevented.

FIG. 2 shows a further main component of the valve assembly according to the disclosed embodiments: underneath the valve retainer 9, that is to say between the valve retainer 9 and the valve plate 3, there is arranged a thin-walled valve lamina 15 which is adapted to an outline of the valve retainer 9 and which serves as a movable or actuable valve member of the valve assembly 1. To open and close the compressed-air opening 5, the valve lamina 15 can be moved relative to the valve retainer 9 and to the valve plate 3. For example, this can be achieved by a flexible material of the valve lamina 15, with the result, in particular, that the valve lamina 15 can be bent or deformed. The exposure and closing of the compressed-air openings 15 can be accomplished substantially exclusively by way of elastic bending of the valve lamina 15. For example, as illustrated in FIG. 2, the valve lamina 15 too has, in the region of a short end 17 associated with the short end 11, a bore 19 for screwing the valve retainer 9 and the valve lamina 15 to the valve plate 3. Otherwise, the valve lamina 15 has a substantially constant cross section.

The state of the valve assembly 1 which is illustrated in FIG. 2 is the closed state. The valve lamina lies flat on the valve plate 3 and closes the compressed-air opening 5 from above. The valve lamina 15 can consist of or comprise a bendable, elastic material to deform, in particular elastically, to expose and/or close the compressed-air opening and, when moving in the opposite direction of movement, to use the elastic deformation restoring force of the valve lamina 15. To open the compressed-air opening 5, use is made of the pressure difference between the compression chamber and the air chamber of the piston compressor. For example, to expose the compressed-air opening 5, that is to say to raise the valve lamina 15 out of the closed position illustrated in FIG. 2, the prevailing pressure difference upstream and downstream of the valve lamina exceeds the elastic deformation restoring force of the valve lamina 15, with the result that the latter is raised and an opening cross section of the compressed-air opening is exposed, thus enabling compressed air to flow past the valve 7 or the valve lamina 15 and the valve retainer 9 through the compressed-air opening 5.

As can be seen in FIG. 2, the cross section of the valve retainer 9 tapers from the securing short end to the compressed-air-side short end 21. In the embodiment shown in FIG. 2, this is achieved in that a lower side 23 of the valve retainer 9, facing the valve lamina 15, is formed obliquely. In this way, a free space 25 is formed between the valve lamina 15 and the valve retainer 9, said space increasing continuously in its cross section in the direction of the compressed-air-side short end 21. This free space 25 makes it possible for the valve lamina 15, which is flexible or movable relative to the valve retainer 9, to lift off from the valve plate 3 to expose the compressed-air opening 5.

According to disclosed embodiments, the valve assembly 1 furthermore has a damping and/or braking device 27 associated with the valve lamina 15. The damping and/or braking device 27 is configured to damp, brake or slow down the impact of the valve lamina 15 on the valve retainer 9 when the compressed-air opening 5 is opened or exposed and/or the impact of the valve lamina 15 on the valve plate 3 during the closing of the compressed-air opening 5, thus ensuring that vibration excitation of the valve retainer 9 or valve plate 3 is reduced, resulting in reduced acoustic emissions during the actuation of the valve assembly 1.

Figure 4:
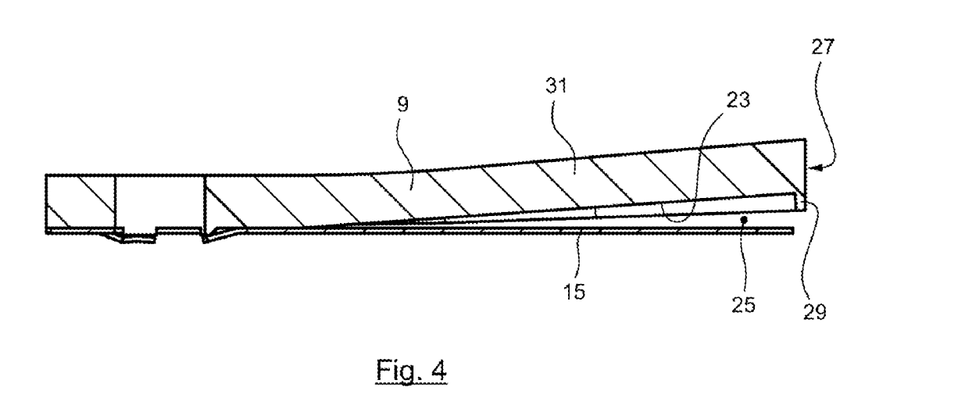
FIG. 4 shows a sectional view of a further illustrative embodiment of a valve assembly according to a disclosed embodiment.
Figure 5:
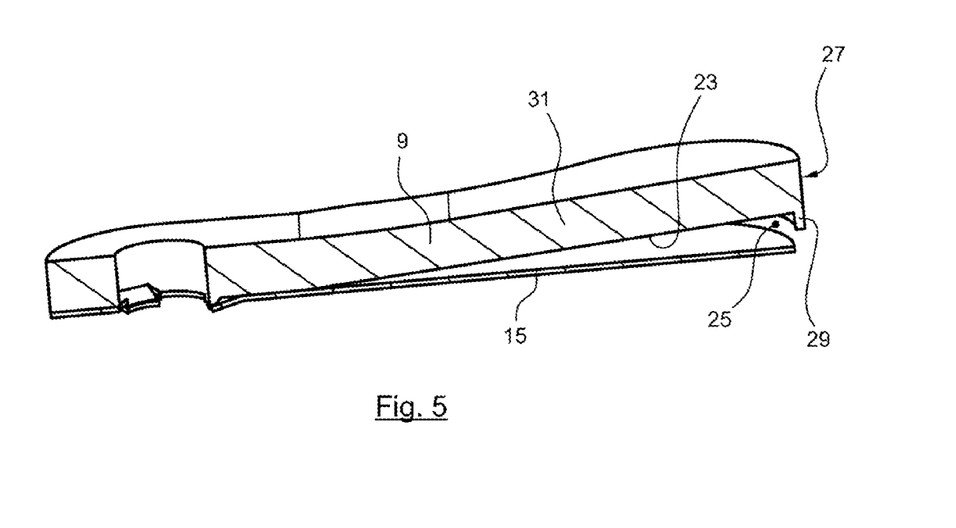
FIG. 5 shows the valve assembly shown in FIG. 4 in perspective illustration.
Figure 6:
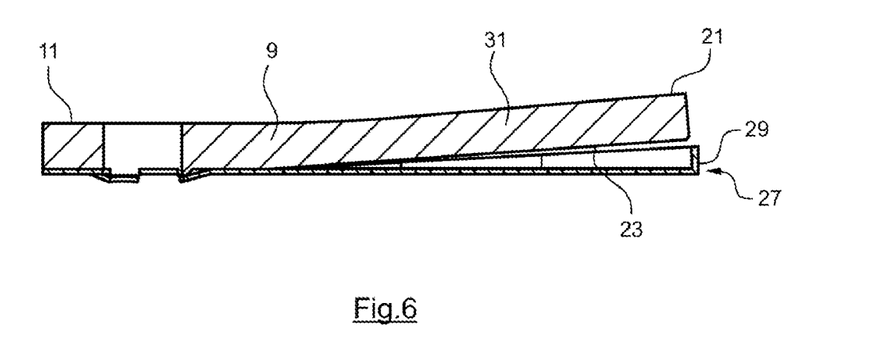
FIG. 6 shows a sectional illustration of a further illustrative embodiment of a valve assembly according to a disclosed embodiment.
Figure 7:
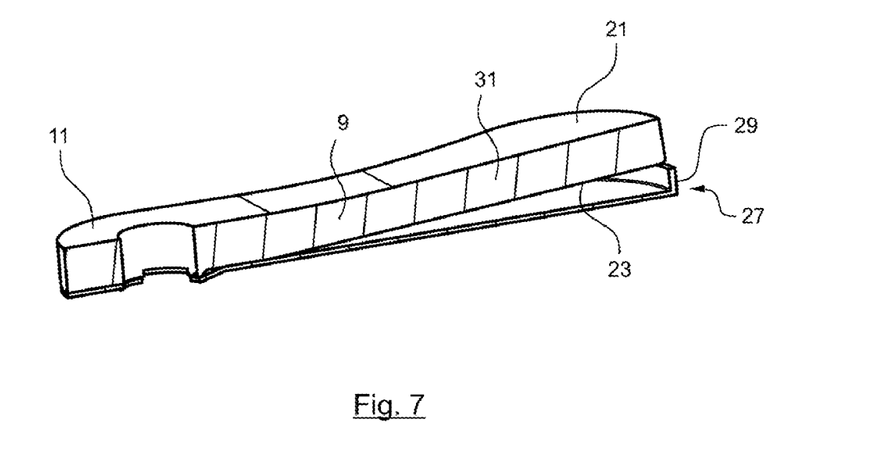
FIG. 7 shows the sectional view of the valve assembly shown in FIG. 6 in perspective illustration.
Figure 8:
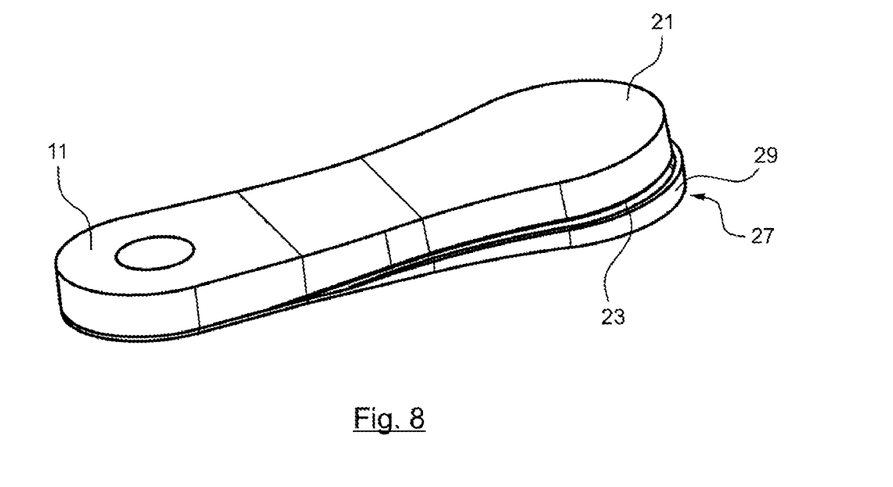
FIG. 8 shows the valve assembly shown in FIGS. 6 and 7 in perspective illustration.

According to the disclosed embodiments, the damping and/or braking device 27 comprises a skirt 29 which, according to FIGS. 2 to 5, is arranged on the valve retainer 9 and, according to FIGS. 6 to 8, is arranged on the valve lamina 15. The skirt 29 is dimensioned and/or is matched in terms of shape to the respective other component to which the skirt 29 is not attached in such a way that, during the opening of the compressed-air opening 5 by the valve lamina 15, the skirt 29 surrounds an outer contour of the respective other component, at least in some section or sections. The skirt 29 is arranged on the valve retainer 9 or the valve lamina 15 at least in the region of the compressed-air-side short end 21 and extends substantially perpendicularly to the planar extent of the valve lamina 15 or of the valve retainer 9 in the direction of the respective other component, either the valve lamina 15 or the valve retainer 9. This makes it possible for the valve retainer 9 and the valve lamina 15 to move into one another during an actuating movement of the valve lamina 15, that is to say during the opening and/or exposure of the compressed-air opening 5. As the valve lamina 15 and the valve retainer 9 are moved into one another, an air cushion is formed between the valve lamina 15 and the valve retainer 9 as a result of the skirt 29 which fits around or surrounds the respective other component, said air cushion effecting damping and/or braking of the valve lamina 15. In particular, the air cushion is formed in that an air reservoir is formed between the valve lamina 15 and the valve retainer 9, in which air is at least temporarily enclosed for damping and/or braking the valve lamina 15. The term "at least temporarily" should be understood to mean that there is a small gap, in particular having a dimension of two to three tenths of a millimeter, between the skirt 29 and the respective outer contour of the other component, either the valve lamina 15 or valve retainer 9, via which small amounts of air can escape from the air reservoir. The effect of the air cushion is therefore noticeable especially during the opening movement of the valve lamina 15, i.e. during a movement out of the stop or closing contact with the valve plate 3 in the direction of the oppositely situated valve retainer 9.

As the compressed-air opening 5 is closed again, that is to say when the elastic deformation restoring force of the valve lamina 15 again exceeds the pressure difference downstream and upstream of the valve lamina 15, forcing the latter into its closed position or into the stop or closing contact with the valve plate 3, a vacuum builds up between the valve retainer 9 and the valve lamina 15 as the valve lamina 15 is removed from the valve retainer 9, and this has a suction effect on the valve lamina 15. As a result, the closing speed and/or the closing acceleration of the valve lamina 15 in the direction of the valve plate 3 is reduced, and therefore the impact on the valve plate 3 is damped or braked and thus vibration excitation, which would generate acoustic emissions, is reduced.

Figure 3:
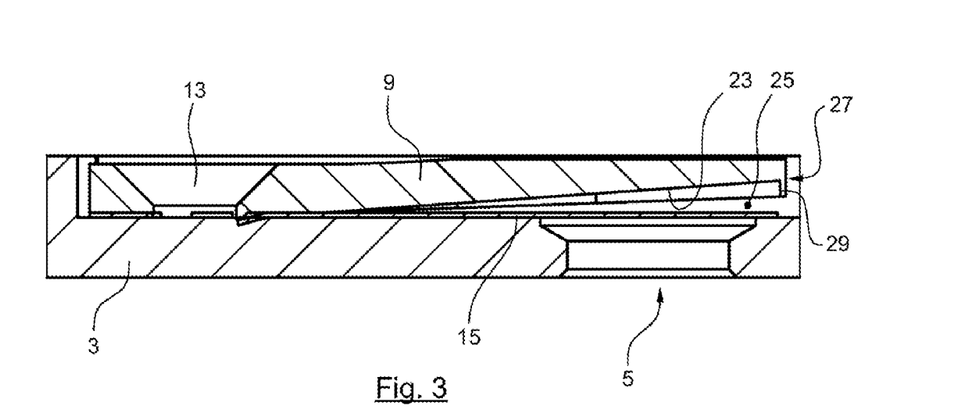
FIG. 3 shows the detail sectional view according to FIG. 2 in a side view.

It can be seen, in particular, from the illustrations in FIGS. 3 to 5 that, during an actuating movement of the valve lamina 15, the valve lamina 15 and the valve retainer 9 move into one another. According to the embodiment in FIGS. 3 to 5, in which the skirt 29 is arranged on the valve retainer, the valve lamina 15 moves into the valve retainer 9 in such a way that the skirt 29 fits around or surrounds the outer contour of the valve lamina 15, at least in the region of the compressed-air-side short end of the valve lamina.

The embodiment of the valve assembly 1 in FIGS. 4 and 5 differs from the embodiment in FIGS. 2 and 3 essentially in that the valve retainer 9 has a constant cross-sectional dimension, but has a curved section 31 which is oriented at an angle to the planar extent of the valve plate 3 to produce the free space 25 for enabling an actuating movement of the valve lamina 15.

The embodiment of FIGS. 6 to 8 of a valve assembly 1 differs from the preceding embodiments in that the skirt 29 of the damping and/or braking device 27 is arranged on the valve lamina 15. During an actuating movement of the valve lamina 15, the skirt 29 on the valve lamina surrounds or encloses an outer contour of the valve retainer 9, at least in the region of the short end 21 of the valve retainer 9. The technical effect and action of the damping and/or braking device 27 is similar to the skirt 27 on the valve retainer, and therefore reference can be made to the preceding embodiments and descriptions.

In particular from FIG. 8, in which the valve assembly 1 is illustrated in a perspective view, it can be seen that a height dimension of the skirt 29 increases continuously in the direction starting from the securing short end 11 in the direction of the opposite short end, in particular of the short end associated with the skirt short end 21. To this extent, a height dimension of the skirt 29 is adapted to the inclination of the valve retainer 9, in particular its curved section 31, or its lower side 23, thus enabling a reliable air reservoir for forming the air cushion to be formed between the valve lamina 15 and the valve retainer 9. Disclosed embodiments accordingly make use of the compressed air which is present in any case to form an aerodynamic damping device which serves to reduce the overall acoustic emissions of the valve assembly.

The features disclosed in the foregoing description, the figures and the claims may be of significance either individually or in any combination for the implementation of the various embodiments.

LIST OF REFERENCE SIGNS

1 valve assembly
3 valve plate
5 compressed-air opening
7 valve 9 valve retainer
11 short end
13 securing bore
15 valve lamina
17 short end
19 opening
21 short end
23 lower side
25 free space
27 damping and/or braking device
29 skirt
31 securing bore
32 oil-free piston compressor
33 rail vehicle

The invention claimed is:

1. A valve assembly for an oil-free piston compressor for generating compressed air in a rail vehicle, which has a valve plate with a compressed-air opening, the valve assembly comprising:
a valve retainer;
a valve lamina, which is flexible and/or movable in relation to the valve retainer and is provided for opening and closing the compressed-air opening; and
a damping and/or braking device associated with the valve lamina,
wherein the valve retainer or the valve lamina has a skirt which is dimensioned and/or arranged on the valve retainer or the valve lamina with respect to the respective other component such that, during the opening of the compressed-air opening by the valve lamina, the skirt surrounds an outer contour of the respective other component at least in some section or sections.

2. The valve assembly of claim 1, wherein the damping and/or braking device includes an aerodynamic damping device.

3. The valve assembly of claim 1, wherein the damping and/or braking device is configured to form an air reservoir between the valve retainer and the valve lamina during the opening of the compressed-air opening by the valve lamina, wherein during opening of the compressed-air opening by the valve lamina, the valve lamina is at least temporarily enclosed in the air reservoir.

4. The valve assembly of claim 1, wherein the valve lamina and the valve retainer are matched to one another in shape such that the valve lamina and the valve retainer move at least partially into one another during the opening of the compressed-air opening by the valve lamina.

5. The valve assembly of claim 1, wherein the skirt is one piece with the valve retainer or the valve lamina.

6. The valve assembly of claim 1, wherein the skirt is arranged on an edge of the valve retainer or of the valve lamina and extends along at least 20%, of the contour of the valve retainer or of the valve lamina.

7. The valve assembly of claim 1, wherein the valve lamina and the valve retainer have an elongate shape and are secured to one another in a region of a short end, wherein the skirt is arranged in the region of the opposite short end.

8. The valve assembly of claim 7, wherein the valve lamina and the valve retainer are of planar design and the skirt extends in a direction of the respective other component substantially perpendicularly to the planar extent of the valve lamina or of the valve retainer.

9. The valve assembly of claim 8, wherein a height dimension of the skirt increases continuously in a direction starting from the securing short end toward the skirt short end.

10. The valve assembly of claim 1, wherein the valve retainer and the valve lamina are matched to one another in shape such that, during the opening of the compressed-air opening by the valve lamina, a gap is provided between the skirt and the outer contour of the respective other component, which is surrounded by the skirt, via which gap air flows out of an air reservoir formed between the valve retainer and the valve lamina.

11. The valve assembly of claim 10, wherein the damping and/or braking effect of the valve lamina is adjustable by the cross section of the gap.

12. The valve assembly of claim 1, wherein the valve lamina is associated with the valve plate such that, in a closed state, the valve lamina closes the compressed-air opening, and the damping and/or braking device is configured to damp and/or decelerate a movement of the valve lamina for closing the compressed-air opening.

13. The valve assembly of claim 12, wherein during the closing of the compressed-air opening by the valve lamina, a vacuum is built up between the valve retainer and the valve lamina, wherein the vacuum reduces a closing speed and/or closing acceleration of the valve lamina in the direction of the valve plate.

* * * * *